United States Patent
Ghosh et al.

(10) Patent No.: US 10,124,819 B2
(45) Date of Patent: Nov. 13, 2018

(54) WHEEL DEFORMITY WARNING SYSTEM

(71) Applicant: General Electric Company, Schenectady, NY (US)

(72) Inventors: Subhankar Ghosh, Karnataka (IN); Aditya Ramkrishna Karnik, Karnataka (IN); Tapan Shah, Karnataka (IN); Babu Ozhur Narayanan, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/231,343

(22) Filed: Aug. 8, 2016

(65) Prior Publication Data

US 2018/0037240 A1    Feb. 8, 2018

(51) Int. Cl.
  *B61K 9/12*   (2006.01)
  *G01M 17/10*  (2006.01)
  *G01L 5/00*   (2006.01)

(52) U.S. Cl.
  CPC .............. *B61K 9/12* (2013.01); *G01L 5/0052* (2013.01); *G01M 17/10* (2013.01)

(58) Field of Classification Search
  CPC ........... B61K 9/00; B61K 9/12; G01M 17/10; G01M 17/08
  USPC ..... 246/169 R, 169 S; 73/146; 701/19, 29.1, 701/34.2
  See application file for complete search history.

(56) References Cited

U.S. PATENT DOCUMENTS

| 3,558,876 A | 1/1971 | Douglaston et al. |
| 4,058,279 A | 11/1977 | Frielinghaus |
| 4,129,276 A | 12/1978 | Svet |
| 4,702,104 A * | 10/1987 | Hallberg ................. B61K 9/12 246/169 R |

(Continued)

FOREIGN PATENT DOCUMENTS

| DE | 3309908 A1 | 11/1983 |
| EP | 1 600 351 A1 | 11/2005 |

(Continued)

OTHER PUBLICATIONS

Filograno, Massimo Leonardo et al., "Wheel Flat Detection in High-Speed Railway Systems Using Fiber Bragg Gratings", IEEE Senors Journal, vol. 13, No. 12, Dec. 2013, DOI: 10.1109/JSEN. 2013.2274008, (pp. 4808-4816, 9 total pages).

(Continued)

*Primary Examiner* — Jonathan Dunlap
(74) *Attorney, Agent, or Firm* — GE Global Patent Operation; Nitin N. Joshi

(57) ABSTRACT

A rail vehicle wheel flat warning system comprising a first sensor, a second sensor and a controller. The first sensor may be located adjacent to a first side of a rail to provide data associated with a rail vehicle wheel passing over the first side of the rail. The second sensor may be located adjacent to the first side of the rail to provide data associated with the rail vehicle wheel passing over the first side of the rail. Furthermore, the controller may be in communication with the first sensor and the second sensor to receive data from the first sensor and the second sensor. The controller may determine a potential wheel deformity based on the data received from the first sensor and the second sensor.

15 Claims, 7 Drawing Sheets

(56) References Cited

U.S. PATENT DOCUMENTS

| | | | | |
|---|---|---|---|---|
| 4,781,060 | A | * | 11/1988 | Berndt ..................... B61K 9/12 246/169 R |
| 5,133,521 | A | | 7/1992 | Gutauskas |
| 5,161,891 | A | * | 11/1992 | Austill ..................... G01B 5/30 33/1 Q |
| 5,330,136 | A | * | 7/1994 | Colbaugh ................. B61L 1/06 246/122 R |
| 7,502,670 | B2 | * | 3/2009 | Harrison ............... B61L 23/044 701/1 |
| 8,818,585 | B2 | | 8/2014 | Bartonek et al. |
| 9,511,783 | B2 | * | 12/2016 | Shimokawa ........... B61K 13/00 |
| 9,714,885 | B2 | * | 7/2017 | Qin ....................... G01M 17/10 |
| 2008/0304065 | A1 | * | 12/2008 | Hesser ................... E01B 35/00 356/400 |
| 2012/0217351 | A1 | * | 8/2012 | Chadwick ............. B61L 25/021 246/169 R |
| 2012/0283963 | A1 | * | 11/2012 | Mitchell ................. F01D 17/02 702/34 |
| 2015/0019071 | A1 | * | 1/2015 | Shimokawa ........... B61K 13/00 701/34.4 |
| 2015/0051792 | A1 | | 2/2015 | Kristen et al. |
| 2015/0227447 | A1 | * | 8/2015 | Adachi ............... G06F 11/3409 358/1.14 |
| 2016/0031458 | A1 | * | 2/2016 | Betancur Giraldo .... B61K 9/12 73/146 |
| 2016/0148171 | A1 | * | 5/2016 | Phan ................... G01M 99/008 702/184 |

FOREIGN PATENT DOCUMENTS

| | | |
|---|---|---|
| EP | 2 631 150 A1 | 8/2013 |
| WO | 87/06203 A1 | 10/1987 |
| WO | 2013/162398 A1 | 10/2013 |
| WO | 2016/115443 A1 | 7/2016 |

OTHER PUBLICATIONS

Stratman, Brant et al., "Structural Health Monitoring of Railroad Wheels Using Wheel Impact Load Detectors", Journal of Failure Analysis and Prevention, (2007), vol. 7, Issue 3, DOI: 10.1007/s11668-007-9043-3, (pp. 218-225, 8 total pages).

International Search Report and Written Opinion issued in connection with corresponding PCT Application No. PCT/US2017/045879 dated Nov. 16, 2017.

* cited by examiner

WHEEL DEFORMITY WARNING SYSTEM

BACKGROUND

Rail vehicles, such as locomotives and rail cars, typically have 4-6 axles and each axle is supported by two iron wheels. With continuous operation, wheels undergo considerable mechanical stress and metal fatigue. These stresses may lead to a gradual flattening or cracking of portions of the wheel tread which can create deformities in the wheels. These deformities, such as, but not limited to 'wheel flats' or cracked wheels, may damage rails as a rail vehicle passes over the rails. Moreover, if the wheels flatten to a point where they become too wide, then the rail vehicle may become derailed while in operation.

Traditional inspection techniques used in the railroad industry, such as drive-by inspections where all of the wheels on the rail vehicle are glanced at while an inspection vehicle drives by, are not as accurate and reliable as more rigorous and quantitative inspection methods. Many damaged wheels aren't found, while many useable wheels are removed when they could remain in service.

The financial impact of a rail vehicle becoming out of service is significant since it can mean a service disruption. Furthermore, by the time a flat wheel may be manually or visually detected, a convenient opportunity to service the flat wheel may have passed and the rail vehicle may have to wait for service and thus the rail vehicle may be taken out of service thus causing a service disruption. Wheel deformities may be detected by direct inspection and measurement of rim thickness or by determining that the deformation on the wheel surface will lead to a part of the wheel not touching the tracks. This loss of contact may be detected using either electrical or optical signals. However, these methods also do not provide adequate notice of wheel deformities to avoid service disruptions. If risky wheels can be detected ahead of time and service crews alerted, then service disruptions may be averted.

SUMMARY

In some embodiments, a rail vehicle wheel flat warning system comprises a first sensor located adjacent to a first side of a rail to provide data associated with a wheel passing over the first side of the rail. The system further comprises a second sensor located adjacent to the first side of the rail to provide data associated with the wheel passing over the first side of the rail and a controller in communication with the first sensor and the second sensor to receive data from the first sensor and the second sensor and to detect a potential deformity based on the data received from the first sensor and the second sensor.

DESCRIPTION

The present embodiments described herein relate to structural monitoring of rail vehicle wheels to detect data collected from rail vehicles while in-service. The data may be collected using sensors such as, but not limited to, load detectors or Wheel Impact Load Detectors (WILDs). The present embodiments further relate to distinguishing wheels with a high probability of having imminent deformities from wheels with a low probability of having imminent deformities.

For example, the present embodiments may indicate the wheels that need to be removed due to imminent wheel flats while at a same allow for wheels that aren't critical to remain in service. As a result, the safety of a railroad may be improved by being able to identify and remove wheels that have high likelihood of causing catastrophic failures.

Figure 1:
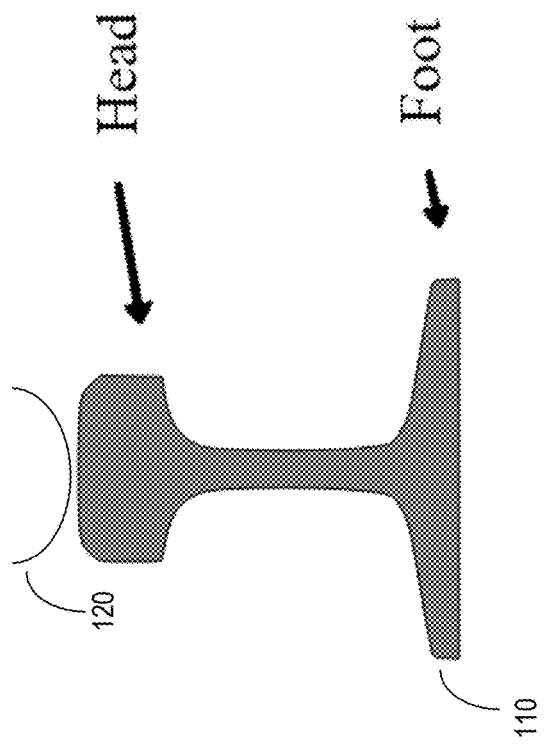
FIG. 1 is a cross section of a rail according to some embodiments.

Now referring to FIG. 1, an embodiment of a rail 110 is illustrated. The rail 110 may comprise a head portion that supports a wheel 120 and a foot to support the rail on a surface, such as, but not limited to, a gravel base. Rail 110 typically comprises hot rolled steel. The rail 110 may be subject to very high stresses caused by the wheel 120 and, as such, may have to be made of very high-quality steel alloy.

As illustrated in FIG. 1, the wheel 120 comprises a rounded surface. However, with continuous operation, the wheel 120 may undergo considerable stress and metal fatigue which may lead to the wheel 120 becoming deformed (e.g., flattened). Wheel 120 may comprise a high impact wheel which may be defined as a wheel that has an impact force of 80,000 pounds or greater. Deformities on high impact wheels may be caused, for example, when a hand break is left engaged while a rail vehicle is in motion. In this situation, because a wheel cannot rotate, friction between the wheel and the rail which may causes the surface of the wheel to deform (e.g., flatten or crack). Deformities may also be caused by defects in tread surface which may lead to catastrophic failure. While derailment of a rail vehicle is a worst case scenario, a more common problem is the financial loss that begins well before a rail vehicle derails due to severe deformities.

Figure 2:
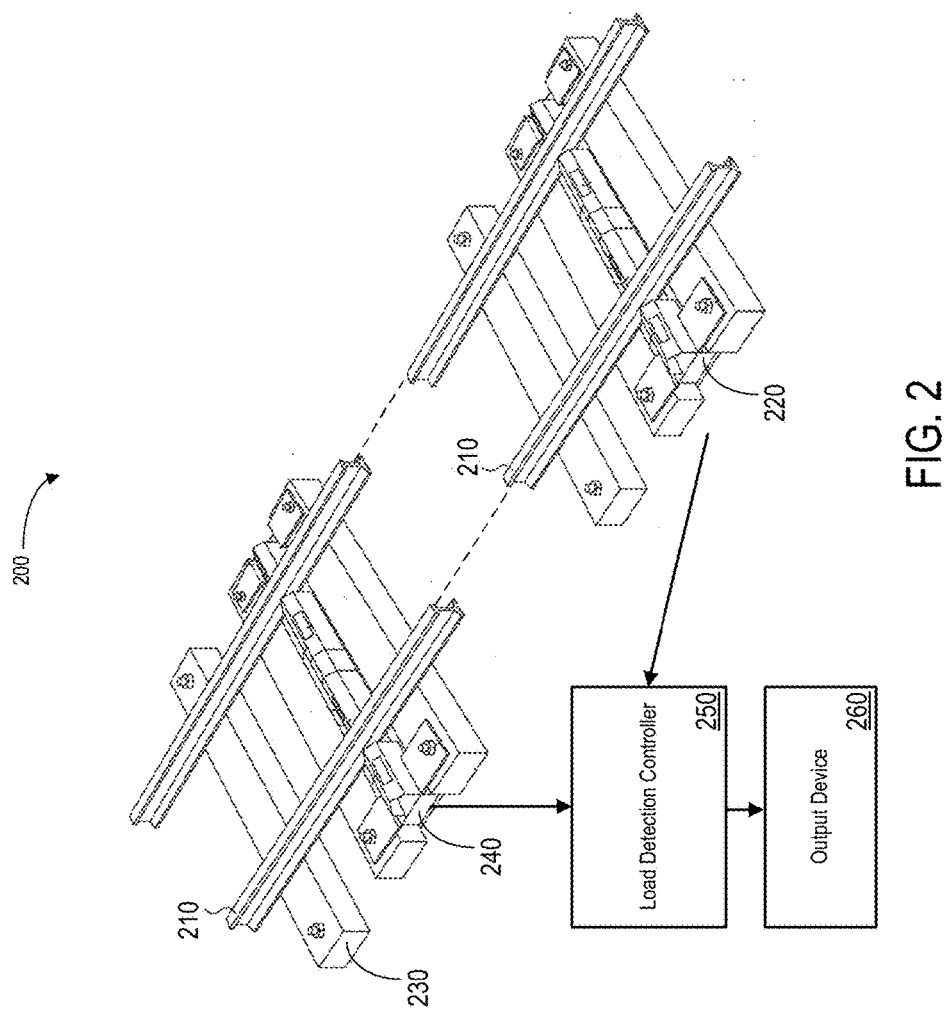
FIG. 2 is a system according to some embodiments.

Now referring to FIG. 2, a system 200 to detect deformities in wheels is illustrated according to some embodiments. The system 200 may relate to monitoring loads on a rail 210 based on a first sensor 220 and a second sensor 240 to detect deformities in wheels passing over the rail 210.

The first sensor 220 and the second sensor 240 may indicate a level of pressure asserted by a rail vehicle while traveling on the rail. The level of pressure asserted by a rail vehicle may be indicated in pound-force per square inch. Each of the first sensor and the second sensor may comprise a bank of gauges placed at different locations along the first side of the rail to measure vertical and horizontal forces exerted by a wheel.

Data from the first sensor 220 and the second sensor 240 may be received at a load detection controller 250. Data from the first sensor 220 and the second sensor 240 may be transmitted to the load detection controller 250 via a wired network connection or via a wireless network connection so that the load detection controller 250 may analyze data from the first sensor 220 and the second sensor 240 in real-time. Data from the load detection controller 250 may be output to an output device 260 to alert railroad personal of potential issues associated with specific rail vehicles and specific wheels. The load detection controller 250 and the output device 260 will be described in more detail with respect to FIG. 6.

Each sensor may comprise one or more gage load circuits adjacent to or welded directly to a rail may create a zone for measurement of vertical forces exerted by each wheel of a passing rail vehicle as well as a speed of the rail vehicle. A load detection controller that comprises signal processors may be housed in a nearby unit. The load detection controller may electronically analyze the data to isolate wheel tread irregularities that may lead to deformed wheels. For example, if any wheel generates a force that exceeds a tailored alarming threshold, a report may identify that wheel for action. To identify specific wheels, axles and rail vehicles, the sensors may receive a signal from each passing rail vehicle that identifies the rail vehicle. In some embodiments, each axle or each wheel may also transmit an identification of the axle and/or wheel to the sensors as they pass over the sensors. However, in some embodiments, the sensor may determine an identification of the wheel or axle based on determining a number of wheels passing over the sensor, a direction that the rail vehicle is traveling and a side of the track where the sensor is located.

The first sensor 220 may reside adjacent to a tie 230, on a tie 230 or between two ties. In some embodiments, the first sensor 220 may be fastened across two or more ties. Each sensor 220/240 may comprise one or more gages adjacent to the rail or, in some embodiments, the one or more gages may be welded to the rail. The series of gages may quantify a force applied to the rail based on a mathematical relationship between an applied load and a deflection of the foot of the rail. These impact forces may be used to monitor rail vehicle wheel health to ensure safe rail vehicle operation.

Figure 3:
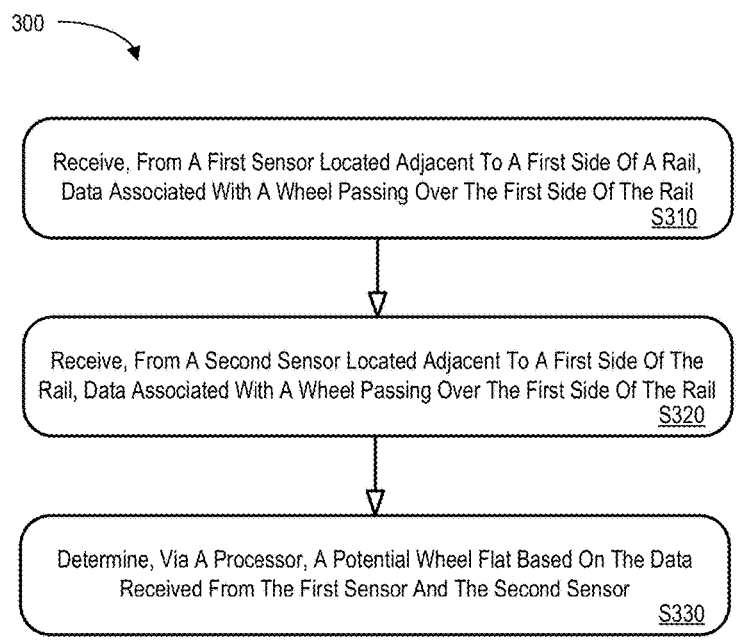
FIG. 3 is a flow diagram of a process according to some embodiments.

Referring now to FIG. 3, an embodiment of a process 300 is illustrated. In some embodiments, various hardware elements (e.g., a processor) of a controller that is configured to receive railroad load detection data may perform the process 300. The process 300 and other processes mentioned herein may be embodied in processor-executable program code read from one or more non-transitory computer-readable media, such as a floppy disk, a CD-ROM, a DVD-ROM, a Flash drive, and a magnetic tape, and may be stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, data associated with a wheel passing over a first side of a rail is received from a first sensor that is located adjacent to the first side of the rail.

Next, at S320, data associated with the wheel passing over a first side of a rail is received from a second sensor located adjacent to the first side of the rail. The data from the first sensor and the second sensor may comprise load related data (e.g., weight related data), speed related data, train identification data, and/or wheel or axle identification data.

For illustrative purposes, and to aid in understanding features of the specification, an example will be introduced. This example is not intended to limit the scope of the claims. For example, two rail vehicles may travel from Boston to Washington, D.C. along a rail. Each of the rail vehicles may have had previous documented wheel flats resulting in the rail vehicles being taken out of service with their repairs documented. Furthermore, adjacent to the rail are a series of sensors such as, but not limited to, WILDs.

At S330, a potential deformity associated with the wheel is determined based on the data received from the first sensor and the second sensor. In some embodiments, the deformity may comprise a wheel flat or a cracked wheel. Determining potential deformities associated with the wheel may comprise comparing real-time data from the first sensor and the second sensor with historic data. For example, previously stored results may be used as a basis for determining if a rail vehicle passing over the first sensor and the second sensor have a likelihood of having a imminent deformity by comparing historical failure data from rail vehicles that had previously failed and been repaired. In some embodiments, the historical failure data may be limited to within a predetermined time period, such as, but not limited to, the past 30 days.

Continuing with the above example, as each of the rail vehicles travels over a plurality of sensors, real-time data from the plurality of sensors may be used to define features associated with the wheels of the rail vehicles and these features may be compared with data from their previous documented wheel flats or failures (e.g., historical data). Based on this comparison, a controller may determine a likelihood of a potential wheel flat occurrence. If the likelihood is greater than a threshold then the rail vehicle may be being taken out of service for inspection and/or repair.

An advantage of the embodiments described herein is that through the use of sensors, such as WILDs, removal of wheels that may damage bearings, lading, rail, other mechanical components, and the wheels themselves may be repaired or replace at times more convenient for railroad operators to minimize service interruptions and to avoid derailments.

Sensors in conjunction with previously stored historical failure data associated with rail vehicles may be used to manage targeted removals of defective wheels from service because the sensors continually monitor rail vehicle and rail car wheel health to ensure safe rail vehicle operations. Furthermore, the sensors may scan thousands of wheels per day and the data from these scans may be stored in a database to provide historical failure data that may be used to develop data models and trends.

Figure 4:
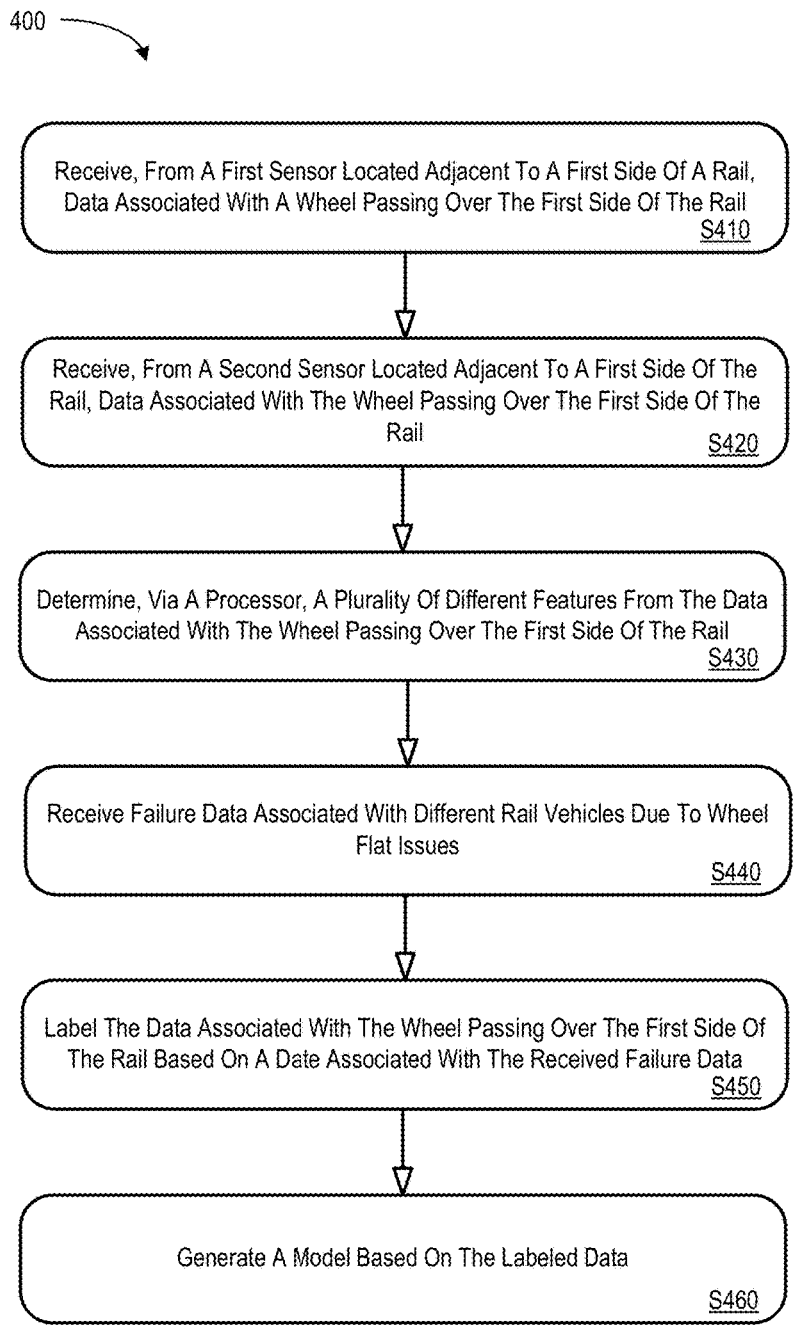
FIG. 4 is a flow diagram of a process according to some embodiments.

Now referring to FIG. 4, an embodiment of a process 400 is illustrated. Process 400 relates to automatically detecting a potential wheel flat of a wheel currently in use on a rail. Furthermore, process 400 may relate to the creation of a wheel flat model that is based on historical wheel failure data, service data and data trends.

At S410, data associated with a wheel passing over a first side of a rail is received from a first sensor that is located adjacent to the first side of the rail. Data associated with the wheel passing over a first side of a rail is received from a second sensor located adjacent to the first side of the rail at S420. The data from the first sensor and the second sensor may comprise load related data (e.g., weight related data), speed related data, train identification data, axle identification data and/or wheel identification data. The load data may comprise a maximum recorded load, a minimum recorded load and an average recorded load for each wheel that traverses two or more sensors. The first sensor and the second sensor may be spaced accordingly to obtain an accurate speed. Furthermore, in some embodiments, data from the first sensor and the second sensor may be combined so that an average weight or force value may be used.

At S430, a plurality of different features from the data is determined. The different features may be associated with the wheel passing over the first side of the rail. For example, the features may comprise a look behind period, a vertical force ratio to determine force being applied to the rail, a speed corrected force, and a haulage corrected value.

The following formula may define a look behind period based on data from the sensors. In the following formula, i refers to a time horizon that will be calculated where m is the wheel or axle number and $w_1^{avg,m}$ is an average force for a current time period, $w_2^{avg,m}$ is an average force for a first previous time period and $w_i^{avg,m}$ is an average force for an $i^{th}$ previous time period.

$$\text{recentmin}(i, m) = \min(w_1^{avg,m}, w_2^{avg,m}, \ldots, w_i^{avg,m})$$

In other words, the above formula calculates a minimum average weight/load for a defined look behind period. The minimum average weight/load may be used as a threshold to determine an average load associated with an individual wheel or axle.

The vertical force ratio formula, as shown below, calculates a peak force value $(w_1^{peak,m})$ divided by an average force value $(w_1^{avg,m})$ for wheel m. The vertical force ratio may be calculated for each wheel.

$$\text{vertfcratio}(m) = w_1^{peak,m} / w_1^{avg,m}$$

The vertical force ratio may be used as a threshold to determine when an individual wheel will have an imminent deformity and that this wheel should be taken out of service for inspection and/or repair.

This vertical force may also be corrected based on a speed that the wheel was travelling. The speed corrected force for a wheel may be calculated as an average force value $(w_1^{avg,m})$ for wheel m minus a constant β multiplied by the measured speed. The constant β may be used for determining a speed corrected value that will be used for logistic regression and β may be derived or estimated from historical data associated with both wheel deformities for a particular wheel and speed to derive a constant that is associated with speed.

$$\text{SpeedCorrectedLoad}(m) = w_1^{avg,m} - \beta * \text{speed}$$

Similarly, a haulage corrected load for each wheel may be calculated where the haulage corrected load for a wheel may be calculated as an average force value $(w_1^{avg,m})$ for wheel m minus a constant γ multiplied by the measured haulage weight. The constant γ may be used for determining a haulage corrected value that will be used for logistic regression and γ may be derived or estimated from historical data associated with both wheel deformities and haulage weight to derive a constant that is associated with haulage. The formula for a haulage corrected load is show below.

$$\text{HaulageCorrectedLoad}(m) = w_1^{avg,m} - \gamma * \text{haulage weight}$$

At S440, previous failure data associated with a plurality of different rail vehicles and wheels associated with the rail vehicles is received. The previous failure data may comprise historical failure data that may be due to wheel deformities. The historical failure data may be stored in a database such as database 700 that is described with respect to FIG. 7 below. The historical failure data may be associated with specific rail vehicles that have had a failure during operation. The historical failure data may comprise data associated with a wheel such as (i) recorded loads when a wheel failed, (ii) recorded speeds at which a wheel failed (iii) recorded speeds at which a wheel when handling a specific weight failed, (iv) haulage weights when a wheel failed, (v) a temperature of the wheel when it failed, etc. This failure data may also include a specific time period when the wheel failed as well as an identification of the specific wheel, an identification of an axle associated with the wheel and/or an identification of the rail vehicle. In some embodiments the failure data may be combined in a database with the data from the first sensor and the second sensor.

At S450, the data associated with the wheel passing over the first side of the rail based on a date associated with the receive failure data is labeled. In other words, the data to be labeled may comprise (i) the failure data as well (ii) the data from the first sensor and the data from the second sensor. In some embodiments, the labeling may be based on an age of the historical failure data. Labeling data may be associated with determining if the historical failure data occurred within a predetermined window of time prior to the data received from the first sensor and the second sensor. For example, a predetermined window may comprise the past 30 days or the past 60 days. By using predetermined windows, historical data may be considered a more realistic view of how and when a particular wheel become deformed or presents as having an imminent deformity. In some embodiments, a rail vehicle or a wheel associated with the rail vehicle that has failed within the predetermined window be indicated with a one (e.g., a Boolean), while data associated with a rail vehicle that has not failed during the predetermined window may be indicated with a zero. In other words, historical data labeled with a one may be relevant data and historical data labeled with a zero may be non-relevant data.

At S460 a model is generated based on the labeled data. The model may be based on a combination of determined features from the historical data that was received within the predetermined window. For example, the models may be based on a combination of determined features (eg., the determined features described with respect to S430 above) that are determined from the data that was labeled with a one. In this situation, the historical data labeled with a zero may be excluded from the model. However, in some embodiments, the models may be based on the historical data that was labeled with a one and the historical data labeled with a zero. The model may be derived using logistic regression which is a regression model which measures a relationship between a categorical dependent variable and one or more independent variables by estimating probabilities using a logistic function. In other words, the logistic regression model provides a probability between a one and a zero of an imminent deformity based on a combination of the determined features and if the probability is greater than a score (typically between 50% and 100%) a one may be indicated.

The model may also be based on the received data from the first sensor and the second senor as well as the reported historical failure data. In some embodiments the model may be created by training a classifier such as a classifier associated with logistic regression. In particular, the classifier may comprise a support vector machine that is a discriminative classifier formally defined by a separating hyperplane. In other words, given labeled failure data, an algorithm may output an optimal hyperplane which categorizes new examples. These new examples may be used to estimate the probability that a wheel associated with a rail vehicle may be indicated as having an imminent deformity (e.g., a failure or in other words the examples may be labeled as having a probably closer to a one or a zero where a one indicates a likelihood of an imminent deformity).

Logistic regression may model a probability distribution of a binary dependent variable. For example, suppose there is a dependent variable Y that takes one of two values 0 or 1. These two values can be thought of as failure/non failure. Also, suppose there are k explanatory variables or features $X_1, X_2, \ldots, X_k$ that determine the outcome Y. In logistic regression, the probability distribution of Y is modeled as $$P(Y=1 \mid X_1, X_2, \ldots, X_k) = \frac{1}{1+\exp(\Sigma_i \beta_i X_i)}$$

Consequently $$P(Y=0 \mid X_1, X_2, \ldots, X_k) = \frac{\exp(\Sigma_i \beta_i X_i)}{1+\exp(\Sigma_i \beta_i X_i)}$$

Figure 5:
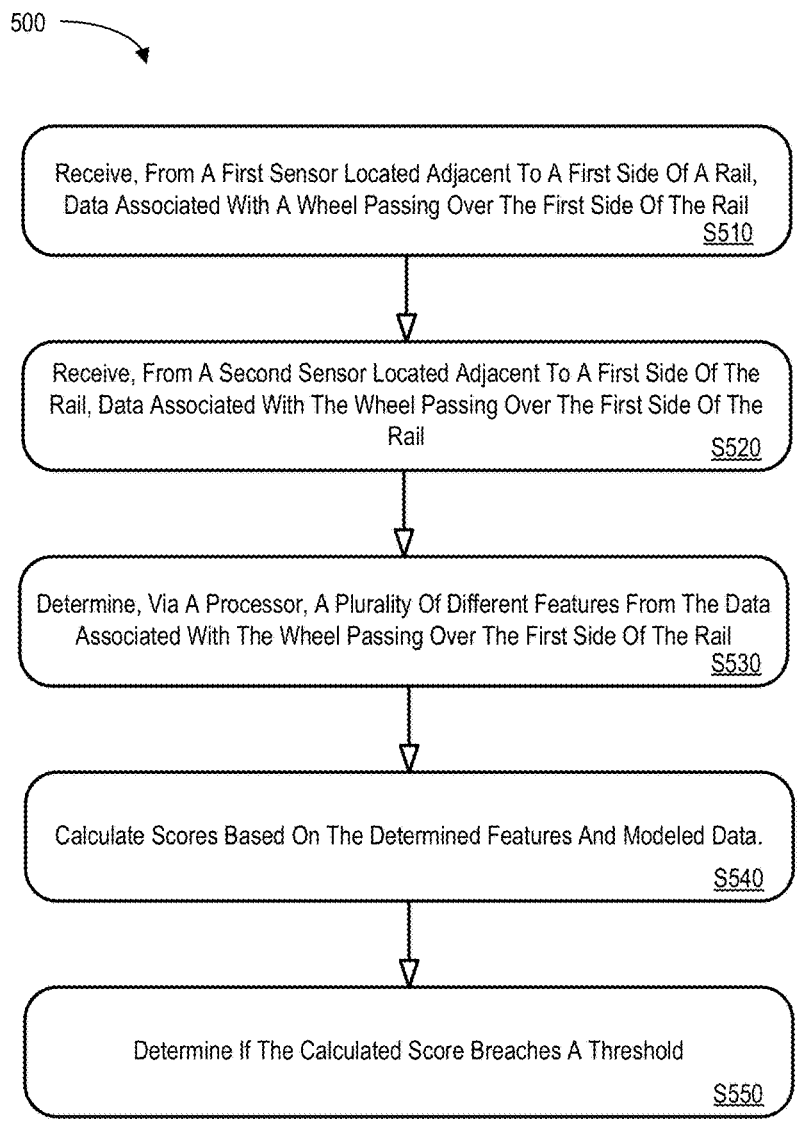
FIG. 5 is a flow diagram of a process according to some embodiments.

The coefficients $\beta_1, \beta_2, \ldots, \beta_k$ are estimated based on maximum likelihood estimation from data where each row corresponds to a realized pattern of $(X_1, X_2, \ldots, X_k, Y)$ Now referring to FIG. 5, an embodiment of a process 500 is illustrated. Process 500 may relate to scoring real-time data received from sensors based on a model for the wheels as disclosed with respect to FIG. 4.

At S510, data associated with a wheel passing over a first side of a rail is received from a third sensor that is located adjacent to the first side of the rail. Data associated with the wheel passing over a first side of a rail is received from a fourth sensor located adjacent to the first side of the rail at S520. The data from the third sensor and the fourth sensor may comprise load related data (e.g., weight related data), speed related data, train identification data, axle identification data and/or wheel identification data. The load data may comprise a maximum recorded load, a minimum recorded load and an average recorded load for each wheel that traverses a bank of sensors.

At S530, a plurality of different features from the data is determined. The different features may be associated with the wheel passing over the first side of the rail. For example, the features may comprise the determined features indicated above such as, but not limited to, a look behind period, a vertical force ratio to determine force being applied to the rail, and a speed corrected force.

At S540, scores based on comparing the determined features to the modeled data are calculated. The features from the real-time data may be analyzed using logistic regression and the resultant data may be compared to previous models to determine if the real-time data is indicated as having a probably closer to a one or a zero where a one indicates a likelihood of an imminent deformity.

At S550 a determination is made as to if the calculated score breaches a threshold. In a case that a score breaches a predetermined threshold of a probability, then railroad service crew may be alerted that the rail vehicle, and a particular wheel, should be inspected and/or serviced at a first opportunity. For example, a threshold score may be calculated by using a comparison with a regression model with a result that indicates an 85 percent chance that the real-time data is indicated as having a probably closer to a one which indicates a likelihood of an imminent deformity.

Figure 6:
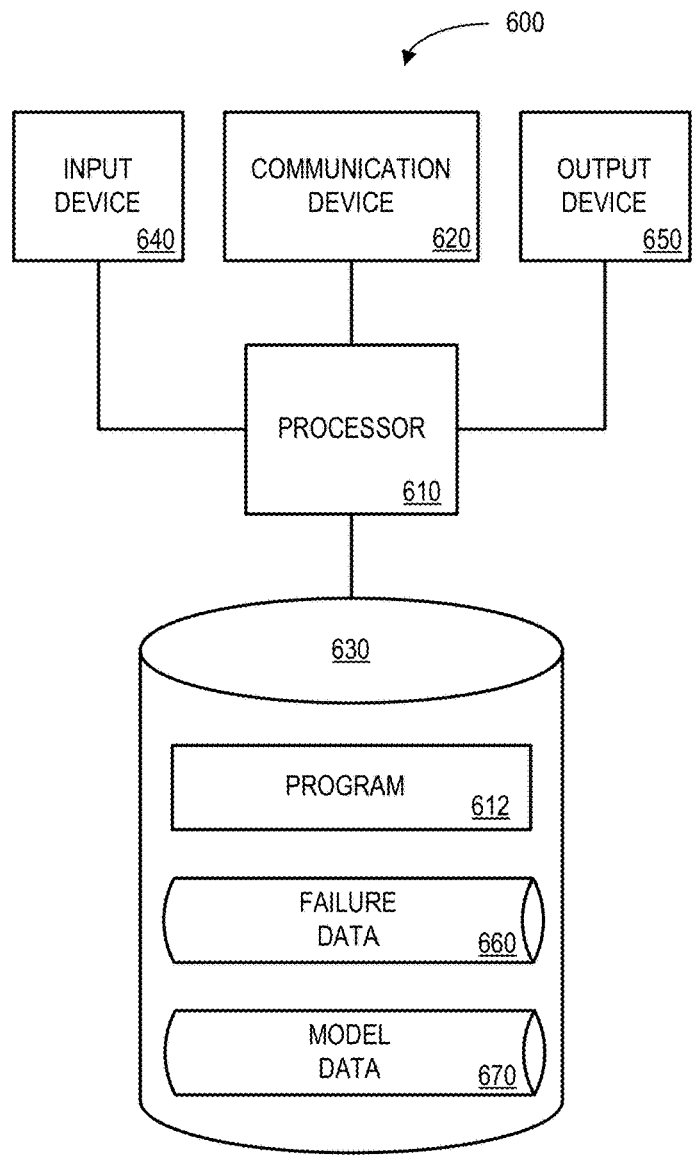
FIG. 6 is an apparatus according to some embodiments.

The embodiments described herein may be implemented using any number of different hardware configurations. For example, FIG. 6 illustrates an apparatus 600 that may be, for example, associated with the system 200 of FIG. 2. The apparatus 600 comprises a processor 610, such as one or more commercially available Central Processing Units (CPUs) in the form of one-chip microprocessors, coupled to a communication device 620 configured to communicate with load sensors via a communication network (not shown in FIG. 6). The apparatus 600 further includes an input device 640 (e.g., a mouse and/or keyboard to enter information about industrial asset operation and anomalies) and an output device 650 (e.g., a computer monitor to output warning and reports).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 (e.g., associated with determining potential deformities in wheels) for controlling the processor 610. The processor 610 performs instructions of the program 612 and thereby operates in accordance with any of the embodiments described herein. For example, the processor 610 might receive load data associated with normal operation of a rail vehicle or rail car. The processor 610, for example, may determine a plurality of different features from the data associated with the wheel passing over a rail.

The program 612 may be stored in a compressed, uncompiled and/or encrypted format. The program 612 may furthermore include other program elements, such as an operating system, a database management system, and/or device drivers used by the processor 610 to interface with peripheral devices.

As used herein, information may be "received" by or "transmitted" to, for example: (i) the apparatus 600 from another device; or (ii) a software application or module within the apparatus 600 from another software application, module, or any other source.

As shown in FIG. 6, the storage device 630 also stores failure data 660 and model data 670 associated with rail vehicle and rail car wheels. One example of a database 700 that may be used in connection with the detection apparatus 600 will now be described in detail with respect to FIG. 7. The illustration and accompanying descriptions of the database presented herein is exemplary, and any number of other database arrangements could be employed besides those suggested by the figures.

Figure 7:
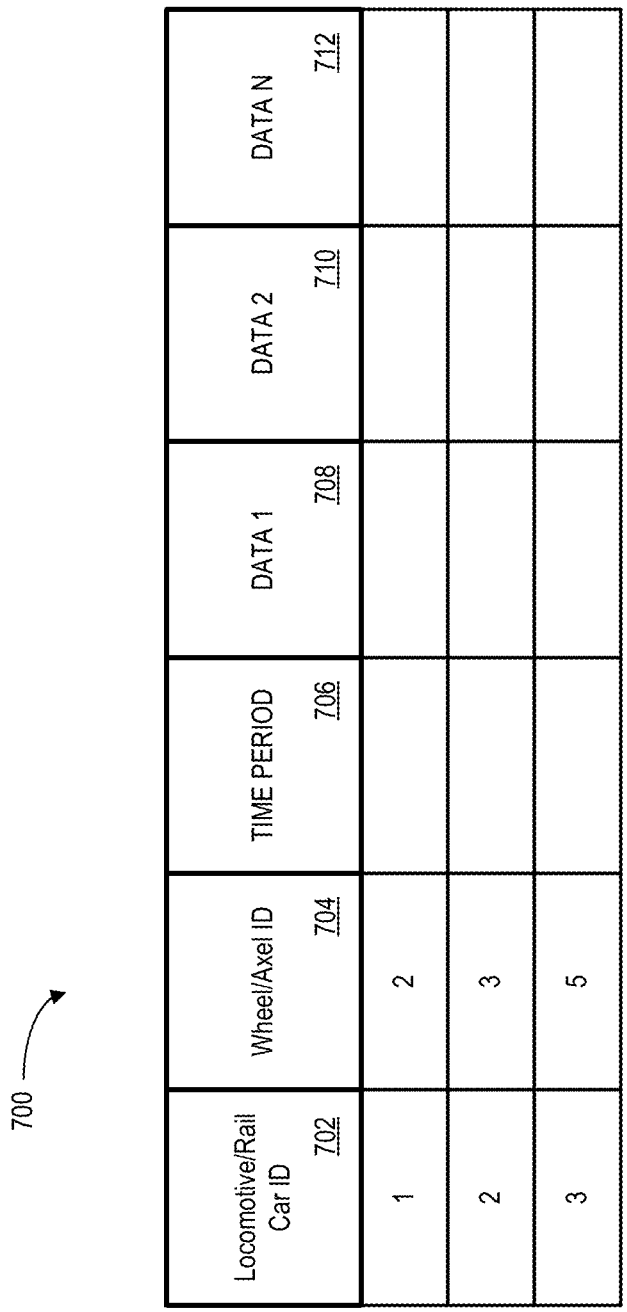
FIG. 7 is a portion of a database table according to some embodiments.

FIG. 7 is a tabular view of a portion of a database 700 in accordance with some embodiments of the present invention. The table includes entries associated with maintenance of rail vehicle wheels. The table also defines fields 702, 704, 706, 708, 710, and 712 for each of the entries. The fields specify: a rail vehicle ID 702, a wheel or axle ID 704, a time period 706, failure data 1 708, failure data 2 710 and failure data N 712. The information in the database 700 may be periodically created and updated based on information collection during operation of rail vehicles as they are received from sensors and service records.

The rail vehicle/rail car ID 702 might be a unique alphanumeric code identifying a specific rail vehicle car and the wheel ID 704 might identify a specific wheel or axle of a rail vehicle. The time period 706 may relate to previous service associated with a wheel of a rail vehicle. The database also includes failure related data 1 through N 708, 710 and 1012, but embodiments may be associated with any number of failure related data The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A deformity warning system for a wheel of a rail vehicle, the system comprising:
   a first sensor located adjacent to a first side of a rail to provide real-time data associated with a wheel of a rail vehicle passing over the first side of the rail;
   a second sensor located adjacent to the first side of the rail to provide real-time data associated with the wheel of the rail vehicle passing over the first side of the rail; and
   a controller in communication with the first sensor and the second sensor to receive the real-time data from the first sensor and the second sensor,
   wherein the controller is configured to:
   receive historical failure data associated with a deformity of the wheel, wherein the historical failure data occurring within a predetermined time period is labeled;
   determine a model based on the labeled historical failure data;
   determine a plurality of features associated with the real-time data from the first sensor and the second sensor;
   calculate a score by comparing the plurality of features with the model, and
   determine whether the score breaches a threshold, and if so, transmits an alert to an output device.

2. The system of claim 1, wherein the first sensor and the second sensor indicate a level of pressure asserted by the rail vehicle while traveling on the rail.

3. The system of claim 2, wherein the first sensor comprises a bank of gauges placed at different locations along the first side of the rail to measure vertical and horizontal forces exerted by the wheel.

4. The system of claim 2, wherein the level of pressure asserted by the rail vehicle is indicated in pound-force per square inch.

5. The system of claim 1, wherein the deformity comprises a wheel flat.

6. The system of claim 1, wherein the historical failure data is combined with the real-time data from the first sensor and the data from the second sensor to form combined data.

7. The system of claim 1, wherein the plurality of different features comprises one of a look behind period, a vertical force ratio, a speed corrected force, and a haulage corrected value.

8. The system of claim 7, wherein the look behind period is determined by the following formula:

$$\text{recentmin }(i, m) = \min(w_1^{avg,m}, w_2^{avg,m}, \ldots, w_i^{avg,m})$$

where,
   i refers to a time horizon that will be calculated;
   m is the wheel or axle number;
   $w_1^{avg,m}$ is an average force for a current time period;
   $w_2^{avg,m}$ is an average force for a first previous time period; and
   $w_i^{avg,m}$ is an average force for an $i^{th}$ previous time period.

9. The system of claim 7, wherein the vertical force ratio is determined by the following formula:

$$\text{vertfcratio}(m) = w_1^{peak,m}/w_1^{avg,m}$$

where,
   m is the wheel or axle number;
   $w_1^{avg,m}$ is a peak force value; and
   $w_i^{avg,m}$ is an average force value.

10. The system of claim 7, wherein the speed corrected force is determined by the following formula:

$$\text{SpeedCorrectedLoad}(m) = w_1^{avg,m} - \beta^* \text{speed}$$

where,
   m is the wheel or axle number;
   $w_i^{avg,m}$ is an average force value; and
   β is a constant that is associated with speed.

11. The system of claim 7, wherein the haulage corrected load is determined by the following formula:

$$\text{HaulageCorrectedLoad}(m) = w_1^{avg,m} - \gamma^* \text{haulage weight}$$

where,
   m is the wheel or axle number;
   $w_i^{avg,m}$ is an average force value; and
   γ is a constant that is associated with haulage.

12. The system of claim 1, wherein the model is created by a classifier.

13. The system of claim 12, wherein the classifier is associated with logistic regression.

14. The system of claim 13, wherein the logistic regression models a probability distribution of a binary dependent variable.

15. The system of claim 14, wherein the classifier comprises a support vector machine.

* * * * *